Dec. 10, 1957
P. G. SALERNO
2,815,915
AIR MIXING APPARATUS HAVING TEMPERATURE
AND PRESSURE CONTROL
Filed Aug. 10, 1953
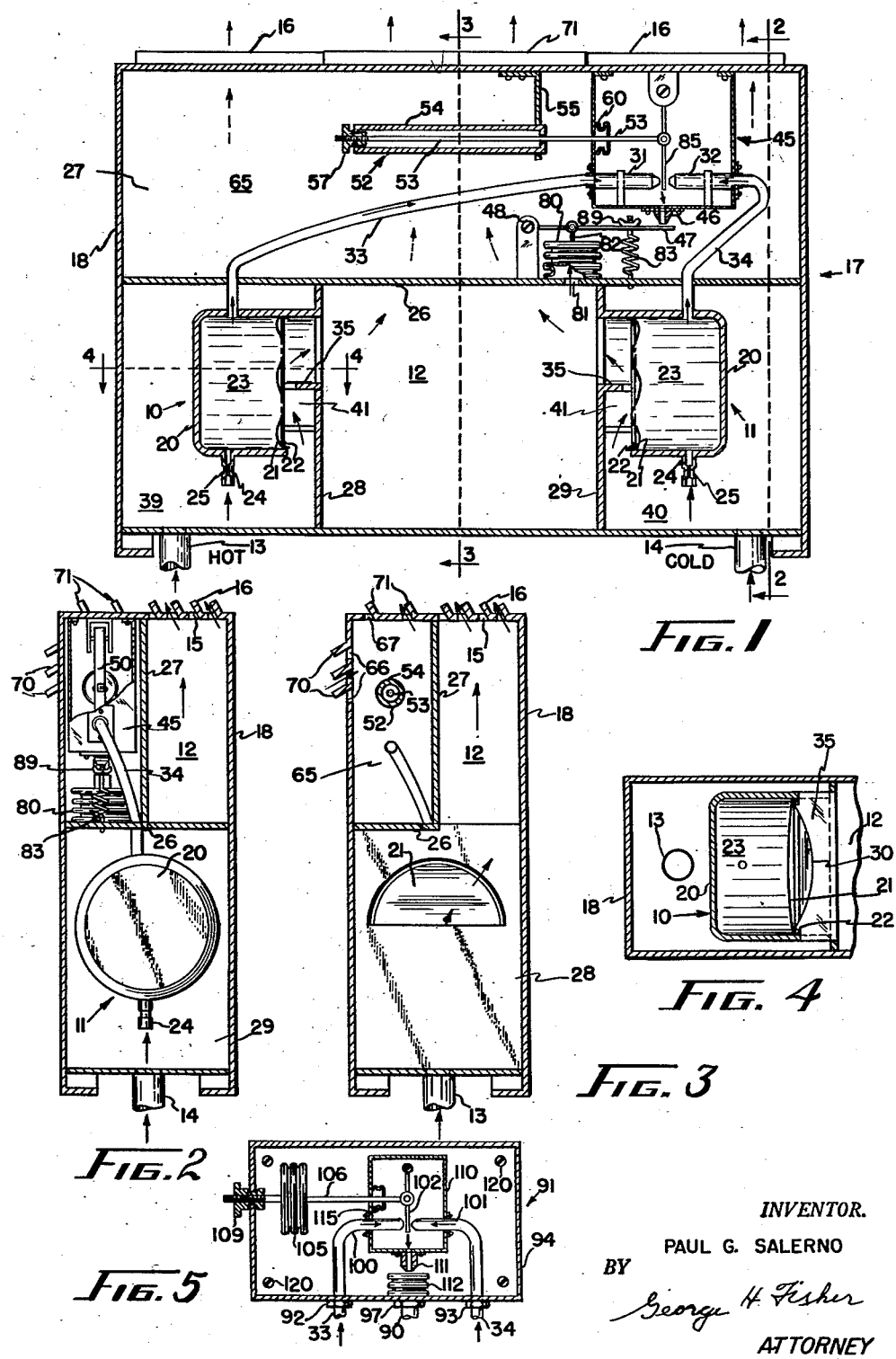
INVENTOR.
PAUL G. SALERNO
BY
George H. Fisher
ATTORNEY

United States Patent Office 2,815,915
Patented Dec. 10, 1957

2,815,915

AIR MIXING APPARATUS HAVING TEMPERATURE AND PRESSURE CONTROL

Paul G. Salerno, Elmwood Park, Ill., assignor to Minneapolis-Honeywell Regulator Company, Minneapolis, Minn., a corporation of Delaware Application August 10, 1953, Serial No. 373,420

12 Claims. (Cl. 236—13)

This invention is concerned with an improved air-conditioning apparatus.

In a type of air conditioning apparatus having many advantages, air is delivered by the use of a pair of relatively small, high pressure, ducts from a source to a unit ventilator or blender. One of the ducts supplies relatively cool air and the other supplies relatively warm air so that air from one or the other of the ducts alone will meet the extreme conditions of temperature control expected. Such an air conditioning apparatus will provide air for ventilation and also air at such a temperature to meet the changing requirements of a space or rooms in which the unit ventilator or blender is installed.

Such a unit ventilator or blender includes a plenum or mixing chamber into which air from the ducts is delivered before entering the space or room. Ordinarily the unit ventilator or blender includes a valve for each duct, a motor for each valve, a thermostatic control device for controlling the motors, and control and power connections whether it be electrical wiring or pneumatic piping to the unit.

The present invention relates to a self-contained thermostatically controlled apparatus for such unit ventilators or blenders wherein the motive power for the valves is obtained from the duct air pressure alone, thereby requiring no external wiring or piping and reducing the overall cost of the unit.

The invention provides for a proportional control of the quantity of air delivered to the mixing chamber or plenum in response to the operation of a thermostatic device which responds to the temperature of the air in the space or room. As the supply air pressure will vary depending on the length of the ducts from the source to the ventilator units, the air pressures developed by the sources of the tempered air, and other factors, the apparatus must have a capacity to supply an adequate amount of air to the space or room at a minimum expected duct pressure sufficient to meet a maximum heating or cooling load. This causes an excessive flow rate of the air from the plenum to the space when the duct air pressure is high, with the excessive flow rates tending to cause noise. However, the present invention provides a means for reducing the flow of air from each duct to the plenum or mixing chamber in response to plenum pressure so that the total rate of air flowing from the unit ventilator is maintained below the noise level and still provide for good temperature control in the space or room.

It is therefore an object of the present invention to provide an improved air conditioning apparatus.

A further object of the present invention is to provide an improved apparatus for controlling the quantities of air flowing from a plurality of sources having different temperatures and to further control the rate of flow of the total quantity of air from the sources to a space.

Another object of the present invention is to provide an improved apparatus for proportionally controlling the operating pressure to a pair of pneumatically operated air flow control devices in response to the temperature of a space and to further modulate the operating pressure to the flow control devices in response to the rate of flow of the air to the space.

Other objects of the invention will be apparent from a consideration of the accompanying specification, claims, and drawing of which:

Figure 1 is a sectional side view of the invention showing the two flow control valves, the temperature responsive unit and the pressure responsive unit which controls the operation of the valves;

Figure 2 is a sectional view of the invention taken on the line 2—2 of Figure 1;

Figure 3 is a sectional view taken on the line 3—3 of Figure 1;

Figure 4 is a sectional view taken on the line 4—4 of Figure 1; and

Figure 5 is a sectional view of the invention showing the temperature responsive unit and the pressure responsive unit which controls the operation of the valves from a remote location.

Referring more particularly to Figure 1, a unit ventilator or blender 17, having an outer housing 18, is divided into chambers by partitioning members. An upper enclosed chamber 65 is formed by a horizontal partitioning member 26 and a vertical partitioning member 27. A pair of spaced vertical partitioning members 28 and 29 cooperating with the member 26 form a pair of chambers 39 and 40 and a mixing chamber or plenum 12.

A pair of pneumatically operated air flow control valves 10 and 11 are arranged to control the flow of air from chambers 39 and 40 to the plenum 12. A conduit 13 is connected to the housing 18 to supply air to chamber 39 from a "hot" source having a temperature the same as or higher than the temperature desired in the room in which the unit ventilator is used. A conduit 14 is similarly connected to the housing 18 to supply air to chamber 40 from a "cold" source having a temperature the same as or lower than the temperature desired in the room. The pressure of the air from the "hot" and "cold" sources can normally range from ½ to 6 inches of water for proper operation of the apparatus; however an excessive pressure differential between the two sources should be avoided. Air is delivered from the plenum 12 through the discharge openings 15 on the upper side of the housing 18 and is directed by the vanes 16 into the space or room in which the temperature is being controlled.

The valves 10 and 11 will be described in detail, and for convenience, the same numbers will be used for similar parts of the valves. The valves each comprise a hollow cylindrical cup-like member 20 open at one end, with a diaphragm member 21 loosely fitted across the member 20. A ring 22 having an outside diameter approximately equal to the inside diameter of the cylindrical member 20 is pressed into the cylindrical member to hold the diaphragm 21, the member in sealing engagement with member 20. A short tube 24 is connected into the underside of member 20, tube 24 having a restriction 25 to limit the flow of air into chamber 23 formed by the closed end of member 20 and diaphragm 21. As before mentioned, air flows into chambers 39 and 40 through conduits 13 and 14 and tends to maintain from ½" to 6" of water pressure in said chamber, this pressure causing air flow through restricted tubes 24 into chambers 23 and tending to raise the pressure in chamber 23 to the same values as found in the respective chambers 39 and 40. The pressure thus exerted in chamber 23 against diaphragm members 21 tend to move them in an outward direction while the pressures in chambers 39 and 40 oppose said pressures in the chambers 23.

The air in chambers 23 is exhausted through a pair of nozzles 31 and 32 mounted facing toward each other, The nozzle 31 is connected by a tube 33 to chamber 23 in valve 10 and nozzle 32 is connected by a tube 34 to chamber 23 in the valve 11. A flapper 85 pivotally mounted at one end thereof is positioned between the nozzles 31 and 32 to simultaneously and oppositely control the discharge flow from the nozzles. By varying the rate of discharge of air through the nozzles 31 and 32, the air pressure exerted against the inside surfaces of diaphragm members 21 can be controlled.

The valves 10 and 11 are fastened to the partitions 28 and 29 respectively, and an entrance portion 41 on the underside of each is exposed to the pressure in chambers 39 and 40, respectively and the remaining portion of the diaphragm of each valve is exposed to the pressure in plenum chamber 12. When the pressure in chamber 23 of a valve 10 or 11, or both, exceeds the opposing pressure the diaphragm member 21 is forced to a valve closing position against a concave seat portion 30 of a member 35 thereby closing the passage between chambers 39 or 40, or both, and the plenum 12. With somewhat less pressure in chamber 23, diaphragm 21 will seek a new and partially open position where the pressure forces are in balance. Thus valves 10 and 11 can selectively control the amount of air flowing from the respective hot and cold ducts to the plenum 12. A compartment 45 houses the nozzles 31 and 32 and has a discharge or outlet nozzle 46 opening out of one of its sides and exposed to ambient pressure through openings 66. A flapper 47, pivotally mounted at 48 cooperates with nozzle 46 to vary its discharge rate.

The flapper 85 is positioned by a temperature responsive apparatus 52. The apparatus 52 shown is of the common rod and tube sort wherein the rod 53 has a relatively low coefficient of expansion and the tube 54 has a relatively high coefficient of expansion. Rod 53 is adjustably connected at one end to an end of the tube 54, the other end of the tube 54 being mounted by a bracket 55 on the housing 18. With the opposite end of rod 53 pivotally attached to flapper 85, it will now be apparent that an increase in temperature of tube 54 will cause it to expand and move rod 53 and flapper to the left whereas an opposite temperature change will contract tube 54 and cause movement of rod 53 and flapper 85 to the right. The adjustment nut 57, by which rod 53 is connected to tube 54, provides the set point adjustment for the thermostat. A flexible seal 60 is provided where rod 53 enters compartment 45 but this has a negligible effect upon the movement of the rod 53.

The temperature responsive device 52 is mounted in the chamber 65, which is separated from chambers 39 and 40 and the plenum 12, as heretofore explained. Openings 66 under vanes 70, on the side of the housing 18 allow air from the space or room in which the temperature is being controlled to flow into the chamber 65 while openings 67 adjacent vanes 71, in the upper side of the housing 18 allow the air to flow from the chamber 65 into the space, the airflow being induced by the flow from plenum 12 through openings 15.

Pressure responsive bellows 80 is mounted on the partition member 26 with its inside open to air pressure in plenum 12 through passage 81 and its outside exposed to ambient pressure through openings 66. The bellows 80, through link 82, operates flapper 47 against the bias of spring 83, the spring bias tending to move the flapper 47 away from the orifice 46, and a differential pressure in bellows 80 tending to move the flapper 47 into a flow restricting position. The tension exerted by spring 83 can be varied for calibration purposes by a wing nut 89.

With flappers 85 and 47 in the position shown, the apparatus is in equilibrium and diaphragms 21 are in intermediate positions. The effect of moving either or both of the flappers will subsequently be shown by following some typical operation sequences.

The thermostat or control unit 91, shown in Figure 5, is a modification of the device shown in the unit blender 17 of Figure 1 in that the thermostat 91 can be remotely located by connecting tubes 33 and 34 of the valves 10 and 11 to the connectors 92 and 93, respectively, on a housing 94 and a tube 90 from the plenum 12 to a connector 97. The air in chambers 23 of the valves is exhausted through a pair of nozzles 100 and 101 mounted facing toward each other. A flapper 102 pivotally mounted at one end is positioned between the nozzles by a temperature responsive bellows 105 connected to the flapper by a rod 106 to simultaneously and oppositely control the rate of discharge of the nozzles. The bellows 105 is mounted on the housing 94 by a threaded nut 109 for calibration purposes. A compartment 110 having a discharge outlet 111 on one of its sides, houses the nozzles 100 and 101 and the pressure in the compartment is varied by restricting the outlet 111 with a bellows 112 which is responsive to the difference between the ambient pressure and the plenum pressure. A flexible seal 115 is provided where the rod 106 enters compartment 110. The plenum pressure is applied to the inside of the bellows 112 through the tube 90 and the ambient pressure is applied to the outside of the bellows so that the pressure in the chambers 23 of the valves 10 and 11 is increased as the plenum pressure increases.

Operation

With the apparatus of Figure 1 arranged in a room and connected to suitable air supplies, assume that the temperature in the room now decreases below that desired. Under these conditions, the temperature responsive device 52 will effect movement of the rod 53 and flapper 85 to the right to restrict the discharge of the nozzle 32 and simultaneously decrease the restriction effect on nozzle 31, thereby resulting in an increase in pressure in chamber 23 of valve 11 to force diaphragm 21 in a valve closing direction and a decrease in pressure in chamber 23 of valve 10 to cause the diaphragm to move in a valve opening direction. This results in decreasing the supply of air to the plenum from the cold conduit 14 and increasing the supply of air from the hot duct 13. Upon the temperature in the space increasing, as measured by 52, the flapper 85 will move to the left and, should the temperature increase too much, the opposite operation will take place with the pressure increase in chamber 23 of valve 10 restricting the flow of hot air and the pressure decrease in chamber 23 of valve 11 permitting a greater flow of cool air.

To prevent a noisy delivery of air to the space, due to excessive plenum pressure, the pressure responsive device is calibrated by adjusting the tension on the spring 83 by spring nut 89 so that the pressure differential between the space or room to which the air is delivered and the plenum 12 is maintained within a desired value, thereby controlling the rate of delivery of air through the openings 15. Should the pressure in the plenum 12 exceed the value desired, the flapper 47 is forced toward nozzle 46 by pressure exerted inside bellows 80 to thereby restrict the flow of air from compartment 45. This increase in back pressure on the nozzles 31 and 32 by reducing the pressure drop through them, reduces their flow rates and causes increased pressures in chambers 23 of valves 10 and 11. It is therefore obvious that the control of rate of flow from the device 17 is substantially independent of the position of the flapper 85. Even if one of the nozzles 31 or 32 is completely closed off, overall flow control is effected by varying the back pressure on the open nozzle and, as is readily apparent, the back pressure is varied only the extent necessary to keep the differential of plenum and ambient pressure within the required values.

The operation of the unit blender using the thermostat 91, shown in Figure 5, would be the same except the thermostat could be mounted by screws 120 on the wall at a remote location from the valves 10 and 11.

While I have shown a specific form of my invention for purposes of illustration, it is to be understood that many substitutions and equivalents will be apparent to those skilled in the art; hence, my invention is to be limited only by the scope of the appended claims.

I claim as my invention:

1. In airconditioning apparatus for controlling the temperature of the air of a space and the rate of delivery of air to the space, in combination: a first inlet air conduit for supplying air at a temperature higher than the temperature to be maintained in the space, a second inlet air conduit for supplying air at a temperature lower than the temperature to be maintained in the space; a plenum; first and second pneumatically operated valve means, each valve means comprising a flexible diaphragm member and a passage for the flow of air through said valve, said diaphragm member forming one side of a pressure chamber of each valve; means including said first valve means for connecting said first inlet conduit to said plenum and means including said second valve means for connecting said second inlet conduit to said pleum, the pressure chamber of each valve having a restricted inlet for supplying air from its inlet conduit to its respective pressure chamber; first and second nozzles; means connecting said first and second nozzles to said chambers of the first and second valve means, respectively, said nozzles being of a greater flow capacity than said restricted inlets; a flapper operably positioned between said first and second nozzles for controlling the discharge rates of the nozzles simultaneously and oppositely and thereby controlling the position of the respective diaphragm members of the valves to control the air flow through each valve, means responsive to the temperature operably connected to said flapper; an enclosed compartment into which the flow of air from said first and said second nozzles discharges, said compartment having an outlet nozzle; a second flapper operably controlling the discharge rate of the air from said outlet nozzle; and pressure responsive means for controlling the position of said second flapper in response to the differential pressure between said plenum and the space so that the reduction of flow of air from said first and second nozzles will affect said first and second valve means and maintain the total rate of flow of air to said space at a predetermined value.

2. In airconditioning apparatus for controlling the temperature of the air of a space and the rate of delivery of air to the space and including a plenum in combination: a first inlet air conduit for supplying air at a relatively high temperature, a second inlet air conduit for supplying cooler air; first and second pressure operated valve means, each valve means comprising a flow passage and a flexible member for controlling the flow of air through the passage, said flexible member forming one side of a pressure chamber in said valve means; means including said first valve means for connecting said first inlet conduit to the plenum and means including said second valve means for connecting said second inlet conduit to said plenum; first and second pilot valves; means connecting said first and second pilot valves to the pressure chambers of the first and second valve means, respectively; an operator for controlling the discharge rates of the pilot valves and thereby the pressures in the respective pressure chambers of said valve means, means responsive to the temperature of said space for operating said operator; means including a control valve connected in series with said pilot valves downstream thereof for placing a back pressure on said first and second pilot valves; a second operator for controlling the flow rate of said series connected valve; and means responsive to the differential pressure between said plenum and the space for operating said second operator.

3. In airconditioning apparatus for controlling the temperature of the air entering a space and the rate of delivery of air to the space, in combination: inlet conduit means for supplying air to said space; a plenum; valve means for controlling the flow of air from said conduit means to said space, said valve means including a pressure chamber; conduit means including a restriction for supplying air from said inlet conduit means to said pressure chamber, connecting means including said valve means for connecting said inlet conduit means to said plenum so that air can flow through said valve means to said plenum and then to said space, a second flow restricting means connected to said pressure chamber for bleeding air therefrom, means responsive to the temperature of said space for adjusting said second flow restricting means so that upon an increase of the temperature in the space above a predetermined value said second flow restricting means will be operated in one direction and thereby control said valve means; a compartment having an exhaust means, means controlling said exhaust means in response to the pressure differential between said plenum and the space; and means connecting said second flow restricting means so that air leaving said pressure chamber is delivered to said compartment.

4. In airconditioning apparatus for controlling the temperature of the air of a space and the rate of delivery of air to the space, in combination: a first inlet air conduit for supplying air at a relatively high temperature; a plenum; a second inlet air conduit for supplying cooler air to the space; first and second pressure operated valve means, each valve means comprising a pressure chamber and a flow controlling means; means including a restriction connecting each pressure chamber to its respective inlet conduit; means including said first valve means for connecting said first inlet conduit to said plenum and means including said second valve means for connecting said second inlet conduit to said plenum; first and second adjustable flow restriction means; means connecting said first and second flow restriction means to the pressure chambers of the first and second valve means, respectively, means responsive to temperature arranged to operate said adjustable flow restriction means; and additional flow restriction means connected downstream each of said first and second adjustable restriction means for placing a back pressure equally thereon.

5. In airconditioning apparatus for controlling the temperature of the air of a space and the rate of delivery of air to the space and having a plenum, in combination: a first inlet air conduit for supplying air at one temperature, a second inlet air conduit for supplying air at a different temperature to said space; first and second pressure operated valve means; means including said first valve means for connecting said first inlet conduit to the plenum and means including said second valve means for connecting said second inlet conduit to said plenum; first and second pressure control means, said control means each having a common discharge chamber; means connecting said first and second control means to said first and second valve means, respectively for simultaneously and oppositely controlling said valve means; means responsive to space temperature operatively connected to said first and second pressure control means; third pressure control means, said third means being connected in a series connection with said first and second control means to control the flow from said chamber, and means responsive to the differential pressure between said plenum and the space for controlling said third pressure control means.

6. In airconditioning apparatus in which the temperature of a space is controlled by controlling the temperature and the delivery rate of a temperature changing medium to the space, a first source of temperature changing medium, a second source of temperature changing medium, first and second pressure operated valve means having a pressure chamber to which air is supplied from a source, a plenum, means including said first valve means for connecting said first source to said plenum and means including said second valve means for connecting said second source to said plenum, a first orifice and a second orifice connected in a controlling relation to said first and second valve means for bleeding air from said pressure chamber, restriction means for simultaneously and oppositely controlling the flow of said first and second orifices, means operating said restriction means in response to the temperature of said space, means including a third orifice connected downstream for controlling the back pressure on said first and second orifices and thereby modulating the discharge rate of the orifices, and means controlling said third orifice in response to the pressure differential of said plenum and said space.

7. In airconditioning system in which the temperature of a space is controlled by controlling the delivery rate of a heat carrying medium to space, a first source of heat carrying medium in which the temperature of said medium is at one value, a second source of heat carrying medium in which the temperature of said medium is at a different value, first and second pressure operated valve means having a chamber from which air is bled to open the valve means, a mixing chamber, means including said first valve means for connecting said first source to said chamber and means including said second valve means for connecting said second source to said chamber, first and second orifice means connected in a controlling relation to said first and second valve means for bleeding air therefrom, flow controlling means connected in operable relation with said orifices, means responsive to the temperature of said space for operating said flow controlling means, and further means for controlling the back pressure on said first and second orifices thereby modulating the discharge rate of the orifices, said further means being operable in response to the pressure differential of said plenum and said space.

8. In airconditioning apparatus comprising: first and second valve means for controlling the flow of air, said valve means having pressure driven actuators, first control means responsive to temperature for controlling said first and second valve means at the same time but in opposite directions by controlling the bleeding of said actuators, and said second control means including series valve means responsive to pressure for placing a back pressure on said first control means for controlling said valve means at the same time and in the same direction.

9. In airconditioning apparatus comprising: first and second valve means for controlling the quantities of air from a source to a plenum, first pneumatic control means responsive to space temperature for controlling said valve means simultaneously and in opposite senses, and second pneumatic control means working through said first control means responsive to the total flow between said plenum and said space for controlling said valve means in the same sense, said second control means placing a back pressure on said first control means when flow through said valve means is to be simultaneously modified.

10. In airconditioning apparatus for controlling the temperature of a space and the rate of delivery of air to the space, comprising in combination: a first air conduit for supplying air at a temperature to the space, a second air conduit for supplying air at a different temperature to the space; first and second motor operated valve means; a plenum; means including said first valve means for connecting said first conduit to the plenum and means including said second valve means for connecting said second conduit to said plenum; pneumatic control means responsive to the temperature of the space for selectively controlling said first and second valve means simultaneously and in opposite directions, respectively, and pressure responsive pneumatic control means adding to or subtracting from the effect of said temperature control means responsive to the pressure differential between said plenum and said space for simultaneously controlling both of said valve means in the same direction, said second mentioned control means modifying the back pressure on said first mentioned control means.

11. In airconditioning apparatus, first and second flow control means, first conduit means for supplying air from a first source, second conduit means for supplying air from a second source, a plenum, means including said first flow control means for connecting said first conduit means to the plenum, further means including said second flow control means for connecting said second conduit to said plenum, pilot valve control means for selectively controlling said first and second flow control means in flow increasing and flow decreasing directions or in flow decreasing and flow increasing directions, respectively, and second series connected pilot valve control means connected downstream said first mentioned pilot valve means for controlling both of said first and second flow control means in either an increasing flow or decreasing flow direction.

12. In airconditioning apparatus comprising: first and second air flow control means, first pilot valve control means for selectively controlling said first and second flow control means in a flow increasing and flow decreasing direction or flow decreasing and flow increasing direction, respectively, second series connected pilot valve control means connected downstream said first pilot valve means for controlling both of said flow control means at the same time in either flow increasing or flow decreasing direction, means responsive to room temperature for controlling said first pilot valve means, and means responsive to total air flow for controlling said second pilot valve means.

References Cited in the file of this patent

UNITED STATES PATENTS

| | | |
|---|---|---|
| 699,352 | Tutus | May 6, 1902 |
| 2,220,176 | Rosenberger | Nov. 5, 1940 |
| 2,266,217 | Kingsland | Dec. 16, 1941 |
| 2,425,000 | Paget | Aug. 5, 1947 |
| 2,710,724 | McMahon | June 14, 1955 |